United States Patent
Adam et al.

(10) Patent No.: US 12,434,024 B2
(45) Date of Patent: Oct. 7, 2025

(54) DEVICE FOR NASAL DELIVERY OF FLUID PRODUCT

(71) Applicant: APTAR FRANCE SAS, Le Neubourg (FR)

(72) Inventors: Fabien Adam, Aviron (FR); Vincent Farroco, Envermeu (FR)

(73) Assignee: APTAR FRANCE SAS, Le Neubourg (FR)

( * ) Notice: Subject to any disclaimer, the term of this patent is extended or adjusted under 35 U.S.C. 154(b) by 934 days.

(21) Appl. No.: 17/627,881

(22) PCT Filed: Jul. 16, 2020

(86) PCT No.: PCT/FR2020/051286
§ 371 (c)(1),
(2) Date: Jan. 18, 2022

(87) PCT Pub. No.: WO2021/014078
PCT Pub. Date: Jan. 28, 2021

(65) Prior Publication Data
US 2022/0257885 A1 Aug. 18, 2022

(30) Foreign Application Priority Data
Jul. 19, 2019 (FR) ...................................... 1908237

(51) Int. Cl.
*A61M 15/08* (2006.01)
(52) U.S. Cl.
CPC ......... *A61M 15/08* (2013.01); *A61M 2205/13* (2013.01); *A61M 2205/3313* (2013.01);
(Continued)
(58) Field of Classification Search
CPC .............. A61M 15/08; A61M 2205/13; A61M 2205/3313; A61M 2205/3553;
(Continued)

(56) References Cited

U.S. PATENT DOCUMENTS

2013/0072755 A1* 3/2013 Papania ............... A61M 11/005
600/249
2020/0078543 A1* 3/2020 Graine ................. A61M 11/007
2021/0369992 A1* 12/2021 Norrant ................. A61M 15/08

FOREIGN PATENT DOCUMENTS

WO 2014/165694 A2 10/2014
WO 2018/109409 A1 6/2018

OTHER PUBLICATIONS

International Preliminary Report on Patentability with translation of Written Opinion issued Jan. 25, 2022 in International Application No. PCT/FR2020/051286.
(Continued)

*Primary Examiner* — Kendra D Carter
*Assistant Examiner* — Alexander J Guerrero
(74) *Attorney, Agent, or Firm* — Sughrue Mion, PLLC

(57) ABSTRACT

A device for nasal delivery of fluid product, having a reservoir containing a fluid, a delivery member, and a delivery head on the delivery member, and the delivery head provided with a delivery opening. The nasal device has a camera for determining the spatial positioning of the nasal device inside a nostril, the camera determining the vertical tilt angle and the lateral tilt angle between the longitudinal axis of the nasal device and an axis of the face identified by a plurality of reference points, the orientation of the axis with respect to the nostril identical to whatever the position of the user, a positioning indicator for guiding the user towards an optimal orientation of the nasal device inside the nostril, and an electronic module and automatic actuation mechanism for automatically actuating the nasal device when the camera determines that the nasal device is disposed in an optimal position.

16 Claims, 4 Drawing Sheets

Figure 1:
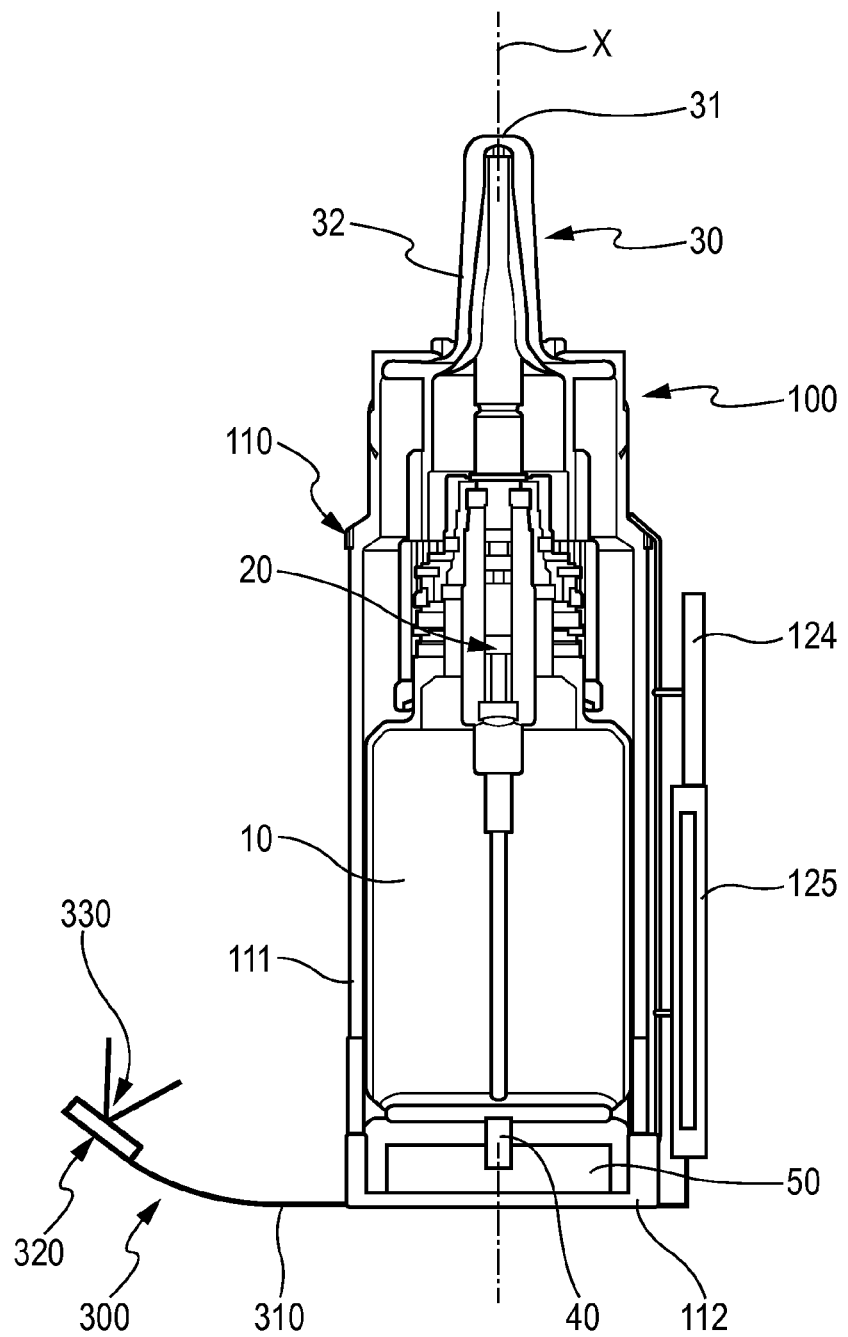

(52) U.S. Cl.
CPC ............... *A61M 2205/3553* (2013.01); *A61M 2205/3584* (2013.01); *A61M 2205/581* (2013.01); *A61M 2205/582* (2013.01); *A61M 2205/583* (2013.01); *A61M 2205/587* (2013.01)

(58) Field of Classification Search
CPC .... A61M 2205/3584; A61M 2205/581; A61M 2205/582; A61M 2205/583; A61M 2205/587; A61M 16/161; A61M 2205/215; A61M 2205/332; A61M 2205/3368; A61M 2205/3592; A61M 2205/43; A61M 2205/502; A61M 2205/8212; A61M 2230/62; B05B 11/0038; B05B 11/1001; B05B 11/1052; B05B 12/122
See application file for complete search history.

(56) References Cited

OTHER PUBLICATIONS

International Search Report of PCT/FR2020/051286 dated Oct. 23, 2020 [PCT/ISA/210].

* cited by examiner

DEVICE FOR NASAL DELIVERY OF FLUID PRODUCT

CROSS REFERENCE TO RELATED APPLICATIONS

This application is a National Stage of International Application No. PCT/FR2020/051286 filed on Jul. 16, 2020, claiming priority based on French Patent Application No. 1908237 filed on Jul. 19, 2019.

The present invention relates to a nasal device for dispensing a fluid product.

Nasal dispensing devices are well known. They generally comprise a reservoir containing one or more doses of fluid products and a dispensing head for dispensing the fluid product, in particular via a pump, a metering valve, or a piston which slides in said reservoir. When the user wishes to use the device, the user inserts the dispensing head into the nostril and actuates the device so as to dispense a dose of fluid product, generally in the form of a spray.

A disadvantage with prior art devices concerns the effectiveness of the dose which is dispensed into the nostril, which often depends on the orientation of the device at the moment the dose is dispensed. As an example, when the dispensed fluid product is intended to act on the brain, only a tiny portion of the dose generally reaches the target zone for this type of treatment, namely the olfactory zone comprising the ethmoid sinuses, in particular because of the orientation of the administering device in the nostril, which varies from one patient to another. Unfortunately, it appears that this orientation determines whether targeting of the target zone is successful, in particular in the case of a closed spray which is used to obtain the maximum deposition into the target zone.

Document WO 98/57690 describes a device for dispensing nasally, comprising orientation means pressed onto the user's top lip. Although that improves the quality of insertion, such an orientation device does not make it possible to guarantee optimal orientation at the moment the dose is dispensed.

Documents WO 02/085282, FR 3 024 655, WO 2014/165694 and WO 2018/109409 describe other prior art devices.

The aim of the present invention is to provide a dispensing device which does not suffer from the aforementioned drawbacks.

In particular, the aim of the present invention is to provide a nasal dispensing device which makes it possible to control the orientation of the device in the nostril, irrespective of the morphology of the patient and irrespective of whether the patient is in a standing, lying or reclining position at the moment the device is used.

Another aim of the present invention is to provide a nasal dispensing device which improves the amount of active fluid that is deposited on the olfactory zone and/or the ethmoid sinuses.

Another aim of the present invention is to provide a nasal dispensing device which makes it possible to inform the user in real time about the quality of insertion of the device into the nostril.

Another aim of the present invention is to provide a nasal dispensing device which enables the user to correct the orientation of the device in the nostril at the moment it is actuated.

Another object of the present invention is to provide a nasal dispensing device which is simple and inexpensive to manufacture and to assemble.

The present invention therefore provides a device for dispensing a fluid product nasally, comprising a reservoir containing fluid product; a dispensing means for dispensing a dose of fluid product upon each actuation, and a dispensing head which is assembled on said dispensing means, said dispensing head being provided with a dispensing orifice, said nasal device comprising:
- a camera for determining the spatial position of said nasal device in a nostril of the user, said camera determining the vertical angle of inclination $\alpha$ and the lateral angle of inclination $\beta$ between the longitudinal axis X of said nasal device and an axis A of the face, said axis A being identified by means of several reference points detected by said camera, in particular three reference points on the nose, six on each eye and five on each eyebrow, the orientation of said axis A with respect to said nostril always being identical irrespective of the position of the user,
- a positioning indicator for guiding the user towards an optimal orientation of the nasal device in said nostril, and
- an electronic module and automatic actuation means adapted to automatically actuate said nasal device when said camera determines that said nasal device is disposed in an optimal position in said nostril.

Advantageously, the nasal device includes a body comprising an upper body disposed around said reservoir and said dispensing means, and a lower body disposed under said reservoir.

Advantageously, said lower body is removable from said upper body.

Advantageously, said lower body contains said automatic actuation means, in particular a pusher element and a motor, which are adapted, during actuation, to displace said reservoir axially upwards with respect to said dispensing head in order to actuate said dispensing means thereby.

Advantageously, said positioning indicator is a visual indicator which is visible to the user when the nasal device is inserted into said nostril.

Advantageously, said indicator comprises a luminous indicator head provided with a plurality of luminous indicators, such as light-emitting diodes, adapted to assist and guide the user in real time in order to improve the positioning of said nasal device.

Advantageously, said camera is disposed at the centre of said luminous indicators.

Advantageously, said positioning indicator is an audible and/or tactile indicator.

Advantageously, said camera and said indicator are radially offset from said nasal device, in particular being formed on an arm which is integral with said nasal device, in particular in an articulated manner.

Advantageously, said camera determines the depth of insertion P of the nasal device into the nostril, in particular by determining the distance in pixels between the two eyes, which varies as a function of the depth of insertion.

Advantageously, said electronic module, such as a printed circuit, comprises a microprocessor containing software for processing information provided by said camera.

Advantageously, the nasal device further comprises a wireless communication module, advantageously a Bluetooth® module, for communication with a remote mobile device.

Advantageously, the nasal device comprises a screen which is adapted to display information that can be seen by the user.

Advantageously, the nasal device comprises a loudspeaker and/or a vibrating element for providing an audible and/or tactile indication to guide the user when positioning the nasal device in said nostril.

Advantageously, the device comprises a sensor, such as an accelerometer, a gyroscope, a brightness sensor, an infrared sensor, a humidity sensor, a temperature sensor, in order to detect the insertion of said nasal device into said nostril.

Advantageously, said reservoir contains several doses of fluid product, said dispensing means being a pump or a valve adapted to dispense one dose upon each actuation.

Figure 2:
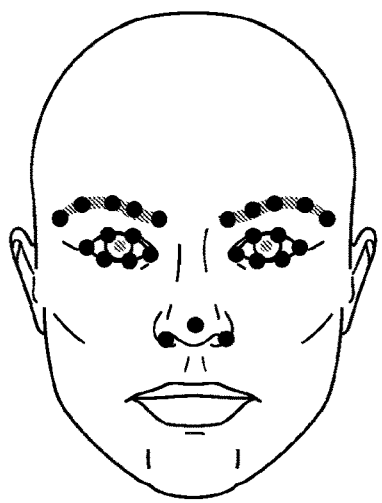
Figure 3:
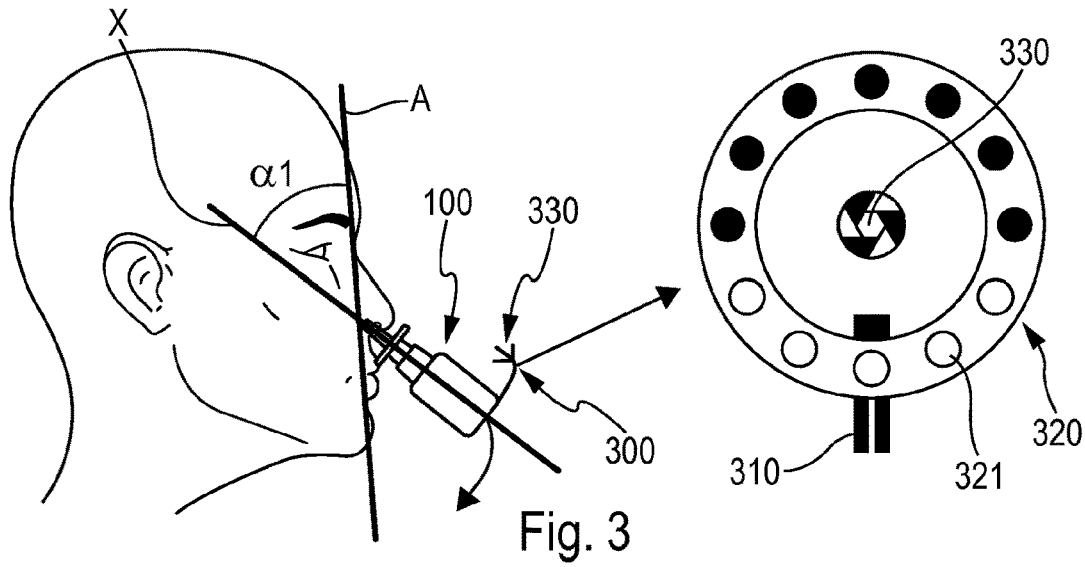
Figure 4:
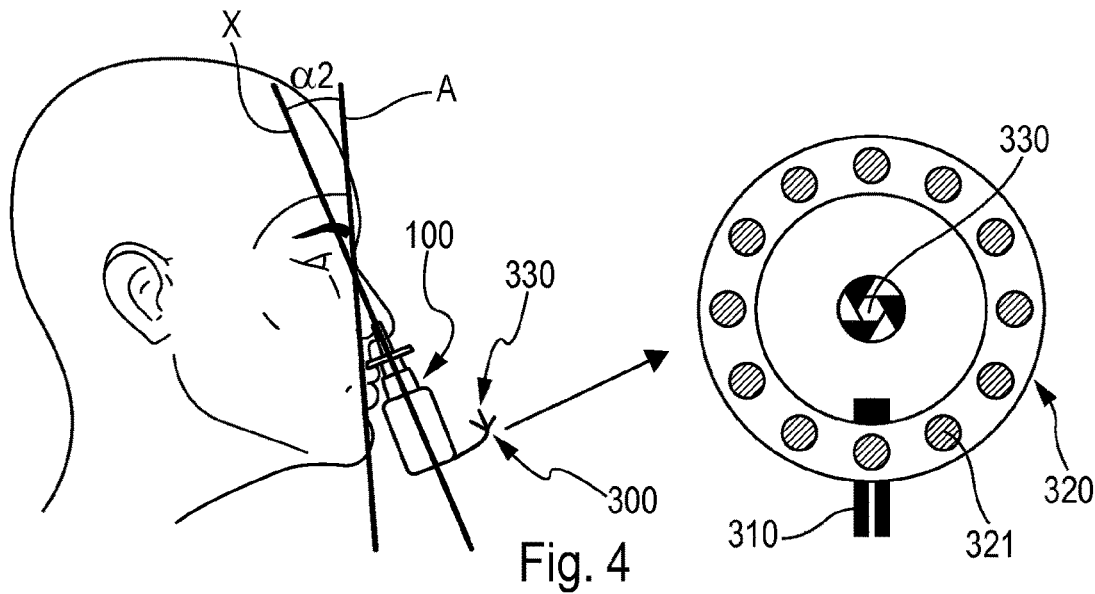
Figure 5:
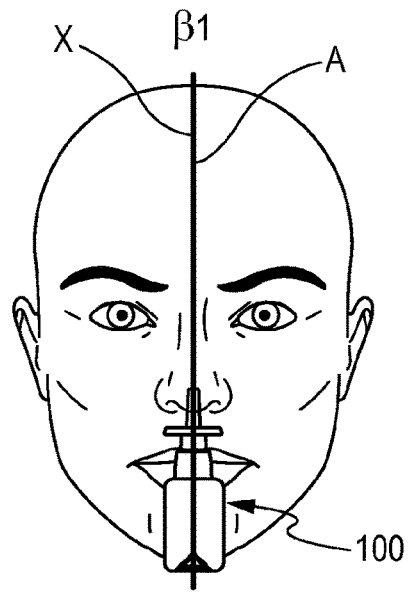
Figure 6:
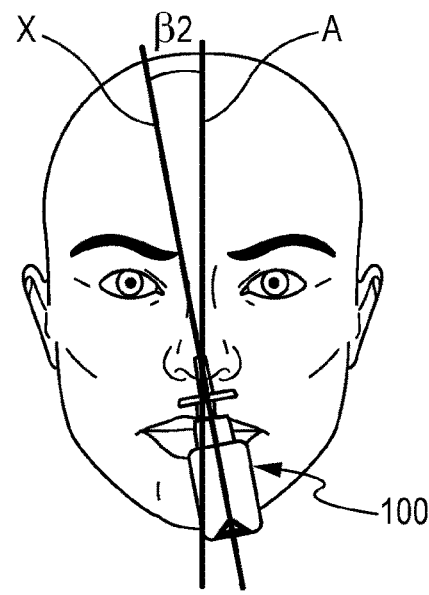
Figure 7:
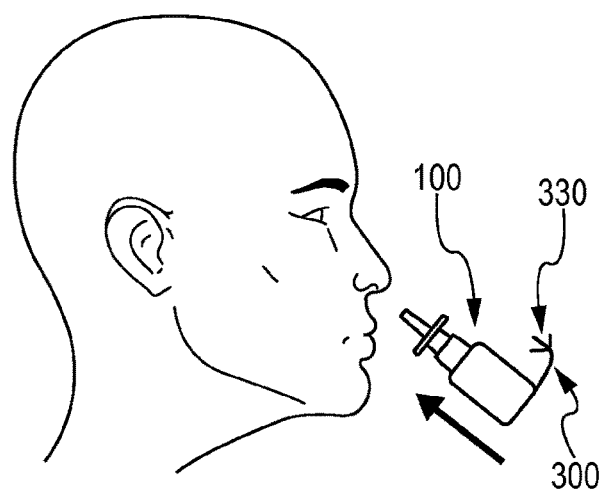
Figure 8:
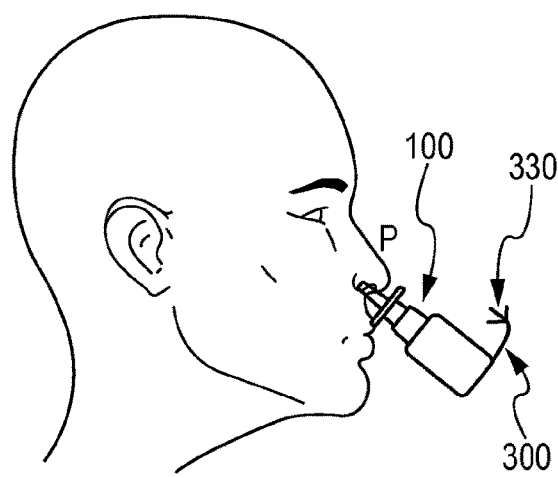
Figure 9:
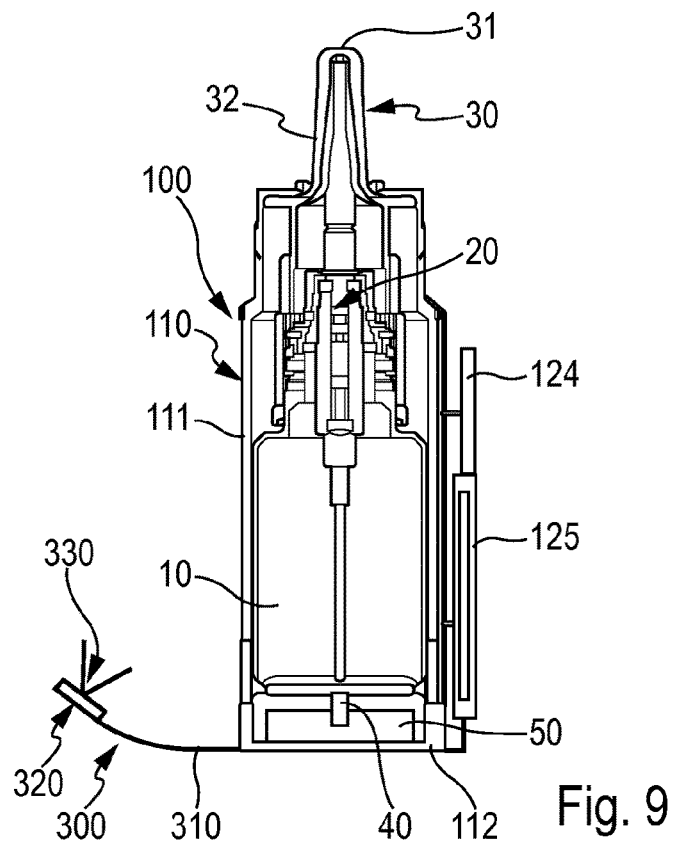
Figure 10:
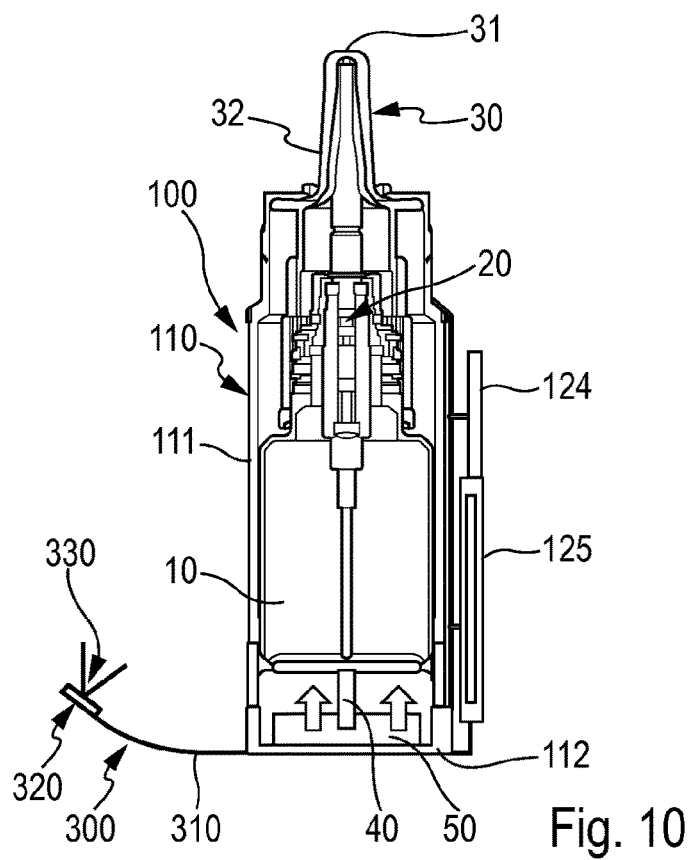

These and other characteristics and advantages will become more apparent from the following detailed description made with reference to the accompanying drawings given by way of non-limiting examples, and in which:

FIG. 1 is a diagrammatic view of a nasal dispensing device in accordance with an advantageous embodiment, FIG. 2 is a diagrammatic front view of a face, showing the reference points used by the camera, FIGS. 3 and 4 are diagrammatic views of the device of FIG. 1, in use by the user, showing the visual indicator of the device which informs the user in real time of the vertical orientation of the device in the nostril, FIGS. 5 and 6 are diagrammatic views of the device of FIG. 1, in use by the user, showing the lateral orientation of the nasal device in the nostril, FIGS. 7 and 8 are diagrammatic views of the device of FIG. 1, in use by the user, showing the insertion of the nasal device into the nostril, and FIGS. 9 and 10 are diagrammatic views of the device of FIG. 1, respectively before and after actuation.

The present invention more particularly concerns a dispensing assembly with a multi-dose nasal device, i.e. comprising a reservoir containing several doses.

However, it should be understood that the present invention is not limited to this type of device, but in contrast can be applied to any fluid product or powder dispensing device either of the single-dose type, i.e. comprising a reservoir which contains a single dose which is dispensed in a single actuation, of the two-dose type, i.e. comprising a reservoir which contains two doses which are dispensed in two successive actuations, or of the multi-dose type, i.e. comprising a reservoir which contains more than two doses.

In the description below, the terms "top", "bottom", "upwards", "downwards", "horizontal", and "vertical" refer to the upright position of the device shown in FIGS. 1, 9 and 10. The terms "axial" and "radial" refer to the longitudinal central axis X of the device, which is visible in FIGS. 1 to 3 and 6.

The nasal device 100 given by way of example is a multi-dose device which comprises a reservoir 10 containing a plurality of doses of fluid, liquid, or powdered product.

A dispensing means 20, such as a pump or a valve, is assembled on the reservoir 10.

A dispensing head 30 which comprises a dispensing orifice 31 is assembled on said dispensing means 20. The dispensing head 30 advantageously comprises a hollow sleeve 32, forming a nasal endpiece, extending axially upwards and terminating at said dispensing orifice 31.

Preferably, the device 100 comprises a body 110. This latter may comprise an upper body 111, disposed around the reservoir 10 and the dispensing means 20, and a lower body 112 disposed under said reservoir 10.

The device 100 comprises actuation means adapted to displace the reservoir 10 with respect to the dispensing head 30, so as to actuate the dispensing means 20 thereby.

In the example shown in the figures, the dispensing head 30 remains stationary with respect to the body 110, and it is the reservoir which is displaced axially upwards during actuation by the actuation means.

Advantageously, the device 100 is actuated by means of a pusher element 40 disposed in the lower body 112 and cooperating with the bottom of the reservoir 10 in order to displace said reservoir 10 axially upwards with respect to said dispensing head 30.

A motor 50 may be provided in order to actuate said pusher element 40 when the device is in the correct orientation in the nostril, as will be explained in greater detail below.

Advantageously, the motor 50 comprises a battery which is rechargeable, for example by means of a socket adapted for this purpose.

Advantageously, the lower body 112 is removable, in particular in order to simplify recharging the battery.

An aim of the invention is to ensure optimal positioning of the device at the exact moment that the device is actuated. This enables better deposition of medication into the nostril.

The user may optionally run a test beforehand at a health specialist's premises in order to determine the optimal angle for that user's own morphology, thereby enabling the user to configure the associated application. Optionally, it is possible to envisage using a scanner or a scan in order to determine the ideal angle accurately.

In accordance with the invention, the nasal device 100 comprises a camera 330 and a positioning indicator 300.

The camera 330 makes it possible to determine the spatial position of the nasal device 100 with respect to the face, and thus with respect to the nostril. The camera 330 thus makes it possible to apply reference points, in real time, in particular around the eyes, eyebrows and nose of the patient, as illustrated in FIG. 2, and to calculate the distances between these various reference points, making it possible to determine the position of the nasal device 100 with respect to the face and therefore the nostril of the patient.

Typically, the camera 330 can identify several reference points, for example twenty-five, as illustrated in FIG. 2 which shows three reference points on the nose, six on each eye and five on each eyebrow. Other facial recognition methods may also be envisaged. The camera thus determines the vertical angle of inclination $\alpha$ of the longitudinal axis X of the nasal device 100 with respect to an axis A of the face defined by said reference points. The orientation of said axis A with respect to the user's nostril is always identical, irrespective of the position of the user. This angle $\alpha$ determines the vertical inclination of the nasal device 100, i.e. upwards or downwards.

The camera 330 also makes it possible to determine the lateral angle of inclination $\beta$ between the axes X and A, i.e. to the left or to the right. Advantageously, the camera 330 also makes it possible to determine the depth of insertion P.

FIG. 3 shows a non-optimal vertical angle $\alpha 1$, in this case about 60°, while FIG. 4 shows an optimal vertical angle $\alpha 2$, typically about 30°. Similarly, FIG. 5 shows a non-optimal lateral angle $\beta 1$, in this case 0°, while FIG. 6 shows an optimal lateral angle $\beta 2$, typically about 10°. Finally, FIG. 7 shows the nasal device 100 which has not been inserted, and FIG. 8 shows the nasal device inserted to an optimal depth of insertion P.

The depth of insertion P can be determined by the camera 330 by measuring the distance in pixels between the two eyes, this distance increasing as the nasal device is inserted into the nostril, as the camera 330 approaches the face.

The positioning indicator 300 makes it possible to guide the user towards an optimal positioning of the nasal device 100 in the nostril. This indicator 300 may advantageously be visual, audible and/or tactile.

The figures show an example of a visual indicator.

This visual indicator 300 is preferably disposed on an arm 310 which makes it possible to offset the indicator laterally with respect to the nasal device in order to be visible to the user even when the nasal device has been inserted into the nostril. This arm 310 may, for example, be pivotally mounted on the lower body 112, as can be seen in the drawings. Clearly, other implementations are possible.

The indicator 300 preferably comprises a luminous indicator head 320 provided with a plurality of luminous indicators 321 such as light-emitting diodes (LEDs). Advantageously, these LEDs are disposed in a circle to form a ring of LEDs. These LEDs can be illuminated in different colours in order to indicate to the user how to change the position of the nasal device in the nostril. Other embodiments are possible, for example four luminous indicators in the form of arrows, orientated in the four cardinal directions.

Preferably, the camera 330 is disposed at the centre of the luminous indicators 321, as illustrated in FIGS. 3 and 4.

The nasal device 100 also comprises an electronic module 125, such as a printed circuit or PCB, comprising a microprocessor containing the software for processing information provided by the camera and the control means for the actuating motor 50.

The electronic module 125 may also incorporate a function for locking the device for a predetermined time after each actuation, in particular if the fluid product contained in the reservoir 10 is a dangerous drug, of the fentanyl type.

The electronic module may advantageously further comprise a communication module, preferably wireless, advantageously a Bluetooth® module, for communication with a remote mobile device such as a computer, a smartphone or a tablet, for transmitting information, for example the date and time of the last dose taken, that for the next dose, the expiry date of the fluid product, etc. The communication module also makes it possible to monitor the use of the nasal device and, for example, to alert a third party in the event of non-use of the device within the required time.

Advantageously, the device 100 may comprise a screen 124, in particular a touchscreen, which is adapted to display information that can be seen by the user.

It may also comprise a loudspeaker and/or a vibrating element to provide the user with an audible and/or tactile indication; this may be useful for the visually impaired, for example. This audible and/or tactile indication may be added to a visual indication such as that described above. Alternatively, the audible and/or tactile indicator may replace the visual indicator.

Optionally, the nasal device 100 may comprise a sensor, such as an accelerometer, a gyroscope, a brightness sensor, an infrared sensor, a humidity sensor, a temperature sensor, to detect when the device 100 is picked up in the hand or when it is inserted into a nostril. This sensor is not obligatory, but it may be advantageous for identifying the moment when the nasal device 100 is actually inserted into the nostril. In this case, it could trigger the electronics to switch from a standby mode to an active mode.

The operation of the assembly will now be described below with reference to the embodiment shown in figures.

Irrespective of the position of the user, standing, lying down or sitting, the user deploys the indicator arm 310 before inserting the nasal device 100 into a nostril.

Description of the Operating Steps:

Rest position: the electronics 125 of the device are on standby; the application indicates that the nasal device 100 is not in use.

Pick-up position: the deployment of the indicator arm 310 activates the electronics 125 of the device; in a variation, the optional sensor may be used to activate the electronics 125, as explained above, in which case this activation does not take place during deployment of the indicator arm 310 but during insertion of the nasal device 100 into a nostril.

Position of the device inserted into the nostril: using facial recognition, the camera 330 measures the vertical angle of inclination α, the lateral angle of inclination β and the depth of insertion P, and thus determines the position of the nasal device 100 in the nostril; if the positioning is outside the optimal zone, an indication, such as red coloured LEDs, is displayed on the indicator 300; the way the LEDs light up in the indicator ring will show the user which direction is wrong and as a result, the user will move the device to improve the position; at the same time, audible indications can be emitted such as, for example, "incline the device upwards/downwardly" and/or "turn the device towards your left/right" and/or "insert further"; similarly, vibrations of the nasal device could help the user to improve the positioning of the nasal device; when the user approaches the optimal orientation, a different indication, such as a different colour for the LEDs, could be displayed on the indicator 300 and/or the vibrations could be speeded up.

Optimal position: when the user has positioned the nasal device 100 in the optimal position, all of the LEDs are displayed in a different colour, for example in green; the vibrations could then be transformed into a continuous sound; in this optimal position, the electronics 125 automatically actuate the motor 50 which will push the pusher element 40 and therefore the reservoir 10 axially upwards in order to dispense a dose of fluid product; at the same time, an audible indication could be emitted such as "actuation of device in progress", for example; thus, before the optimal position is reached, the motor 50 is inactive, and when the optimal position is reached, the electronic module 125 switches on the motor 50 which initiates administration of the dose of fluid product.

After actuation, the screen 124 of the device 100, if one is provided, can display the date and time of the dose which has been administered, the number of doses remaining to be dispensed, the date and time of the next dose, an indication of locking of the device, possibly with a countdown. Other indications are also possible, in particular if the device 100 communicates with a remote device such as a computer, a tablet or a smartphone, in order to transmit information related to the use of the device.

The present invention thus provides numerous advantages:

- it promotes precise angular positioning at the moment a dose is dispensed, thereby ensuring optimal deposition of the fluid product which is dispensed into the nostril;
- it provides "real time" orientation assistance;
- it ensures automatic dispensing of the dose as soon as the optimal position is reached, thereby avoiding any risk of undesirable displacement due to the actuation gesture; the user only needs to hold the nasal device and look for the optimal position according to the indications of the indicator, the actuation of the dispensing member 20 being automatically managed by the camera 330, the electronics 125 and the motor 50;
- it provides a solution which can be used with a large number of nasal dispensing devices of the same type, and is thus not limited to the example described;

it has a minor impact on the design and bulk of the device, and as a result remains easy to carry;

it does not have any impact on the operation and performance of the device, and thus does not modify the performance of the fluid product which is dispensed;

it makes it possible to administer the fluid product easily to a third party;

it can be used in any position, in particular standing, sitting, lying down;

it does not require any additional devices, such as a smartphone or an earpiece, to initially obtain the optimal position in the nostril and then to automatically trigger dispensing of the dose in this optimal position;

it makes it possible to transfer data to doctors, health specialists, pharmacists, regulatory authorities, insurers;

it generates self-learning: finding an optimal angle will become easier and easier for the user, who will subconsciously memorise the correct positioning of the device with respect to the user's morphology.

Clearly, the present invention is not limited to the multi-dose device described above, but applies to any nasal device, whether it be a single-dose device, a two-dose device, or a multi-dose device.

The present invention is particularly intended for the treatment of any pathology which can be treated nasally requiring precise orientation of the nasal device such as, for example, Parkinson's disease or enuresis.

The present invention has been described above with reference to various embodiments, but naturally any useful modification could be applied thereto by the person skilled in the art without departing from the scope of the present invention as defined in the accompanying claims.

The invention claimed is:

1. A device for dispensing a fluid product nasally, comprising a reservoir containing fluid product; a dispensing means for dispensing a dose of fluid product upon each actuation, and a dispensing head which is assembled on the dispensing means, the dispensing head being provided with a dispensing orifice, characterized in that the nasal device comprises:

a camera for determining the spatial position of the nasal device in a nostril of a user, the camera determining the vertical angle of inclination and the lateral angle of inclination between a longitudinal axis of the nasal device and an axis configured on the user's face, the axis on the user's face being identified by several reference points detected by the camera, wherein the several reference points are: three reference points configured on the user's nose, six configured on each of the user's eyes and five configured on each of the user's eyebrows, wherein an orientation of the axis on the user's face, configured to be with respect to the user's nostril, is configured to always be identical irrespective of the position of the user, a positioning indicator for guiding the user towards an optimal orientation of the nasal device in the nostril, and an electronic module and automatic actuation means adapted to automatically actuate the nasal device when the camera is configured to determine that the nasal device is disposed in an optimal position in the nostril.

2. The nasal device as claimed in claim 1, further comprising a body comprising an upper body disposed around the reservoir and the dispensing means, and a lower body disposed under the reservoir.

3. The nasal device as claimed in claim 2, wherein the lower body is removable from the upper body.

4. The nasal device as claimed in claim 2, wherein the lower body contains the automatic actuation means, wherein the automatic actuation means is a pusher element and a motor, which are adapted, during actuation, to displace the reservoir axially upwards with respect to the dispensing head in order to actuate the dispensing means thereby.

5. The nasal device as claimed in claim 1, wherein the positioning indicator is a visual indicator which is configured to be visible to the user when the nasal device is inserted into the nostril.

6. The nasal device as claimed in claim 5, wherein the visual indicator comprises a luminous indicator head provided with a plurality of light-emitting diodes, adapted to assist and guide the user in real time in order to improve the positioning of the nasal device.

7. The nasal device as claimed in claim 6, wherein the camera is disposed at the centre of the plurality of light-emitting diodes.

8. The nasal device as claimed in claim 1, wherein the positioning indicator is an audible and/or tactile indicator.

9. The nasal device as claimed in claim 1, wherein the camera and the positioning indicator are radially offset from the nasal device, wherein the camera and the positioning indicator are configured on an arm which is integral with the nasal device, in an articulated manner.

10. The nasal device as claimed in claim 1, wherein the camera is configured to determine the depth of insertion of the nasal device into the nostril of the user, by determining the distance in pixels between the two eyes of the user, which varies as a function of the depth of insertion of the nasal device.

11. The nasal device as claimed in claim 1, wherein the electronic module is a printed circuit, and includes a microprocessor containing software for processing information provided by the camera.

12. The nasal device as claimed in claim 1, further comprising a wireless communication module for communication with a remote mobile device.

13. The nasal device as claimed in claim 1, further comprising a screen which is adapted to display information that can be seen by the user.

14. The nasal device as claimed in claim 1, further comprising a loudspeaker and/or a vibrating element for providing an audible and/or tactile indication to guide the user when positioning the nasal device in the nostril of the user.

15. The nasal device as claimed in claim 1, further comprising a sensor, selected from the group comprising of: an accelerometer, a gyroscope, a brightness sensor, an infrared sensor, a humidity sensor, and a temperature sensor, configured to detect the insertion of the nasal device into the nostril of the user.

16. The nasal device as claimed in claim 1, wherein the reservoir contains several doses of fluid product, and the dispensing means being a pump or a valve adapted to dispense one dose upon each actuation.

* * * * *